United States Patent
Bächler

(10) Patent No.: US 12,132,298 B2
(45) Date of Patent: Oct. 29, 2024

(54) METHOD FOR WIRING ELECTRICAL COMPONENTS OF AN ELECTRICAL SWITCHGEAR ARRANGED ON A MOUNTING PLATE

(71) Applicant: RITTAL GMBH & CO. KG, Herborn (DE)

(72) Inventor: Andreas Michael Bächler, Haiger (DE)

(73) Assignee: RITTAL GMBH & CO. KG (DE)

( * ) Notice: Subject to any disclaimer, the term of this patent is extended or adjusted under 35 U.S.C. 154(b) by 710 days.

(21) Appl. No.: 17/294,719

(22) PCT Filed: Nov. 27, 2019

(86) PCT No.: PCT/DE2019/101019
§ 371 (c)(1),
(2) Date: May 18, 2021

(87) PCT Pub. No.: WO2020/125852
PCT Pub. Date: Jun. 25, 2020

(65) Prior Publication Data
US 2022/0013996 A1    Jan. 13, 2022

(30) Foreign Application Priority Data

Dec. 21, 2018   (DE) ..................... 10 2018 133 337.4

(51) Int. Cl.
*H02B 3/00* (2006.01)
*B25J 9/16* (2006.01)
(Continued)

(52) U.S. Cl.
CPC ................ *H02B 1/202* (2013.01); *B25J 9/16* (2013.01); *H02B 3/00* (2013.01); *H02G 1/005* (2013.01)

(58) Field of Classification Search
CPC .. H02B 1/202; H02B 3/00; B25J 9/16; H02G 1/005; H02G 1/1248; H01R 43/28
See application file for complete search history.

(56) References Cited

U.S. PATENT DOCUMENTS

| 6,079,097 A | 6/2000 | Henrici et al. |
| 9,272,418 B1 | 3/2016 | Guerin et al. |

(Continued)

FOREIGN PATENT DOCUMENTS

| BE | 1019651 A5 | 9/2012 |
| CN | 103514303 A | 1/2014 |

(Continued)

OTHER PUBLICATIONS

M. Busi et al. "The WIRES Experiment: Tools and Strategies for Roboti/ed Switchgear Cabling", *Procedia Manufacturing*, 43rd North American Manufacturing Research Conference, NAMRC 43, Jun. 8-12, 2015, UNC Charlotte, North Carolina, United States, vol. 11,Jan. 1, 2017 (Jan. 1, 2017), pp. 355-363 DOI: 10.1016/j.promfg. 2017.07.118 ISSN: 2351-9789, XP055539776 the whole document.

(Continued)

*Primary Examiner* — Tho D Ta
(74) *Attorney, Agent, or Firm* — Harness, Dickey & Pierce, P.L.C.

(57) ABSTRACT

The invention relates to a method for wiring electrical components of an electrical switchgear arranged on a mounting plate, comprising:
providing a design of a switchgear comprising at least location information and orientation information about a plurality of electrical components of the switchgear on a mounting plate and wiring information about a plurality of electrical wirings between every two of the electrical components;

(Continued)

Figure 1:
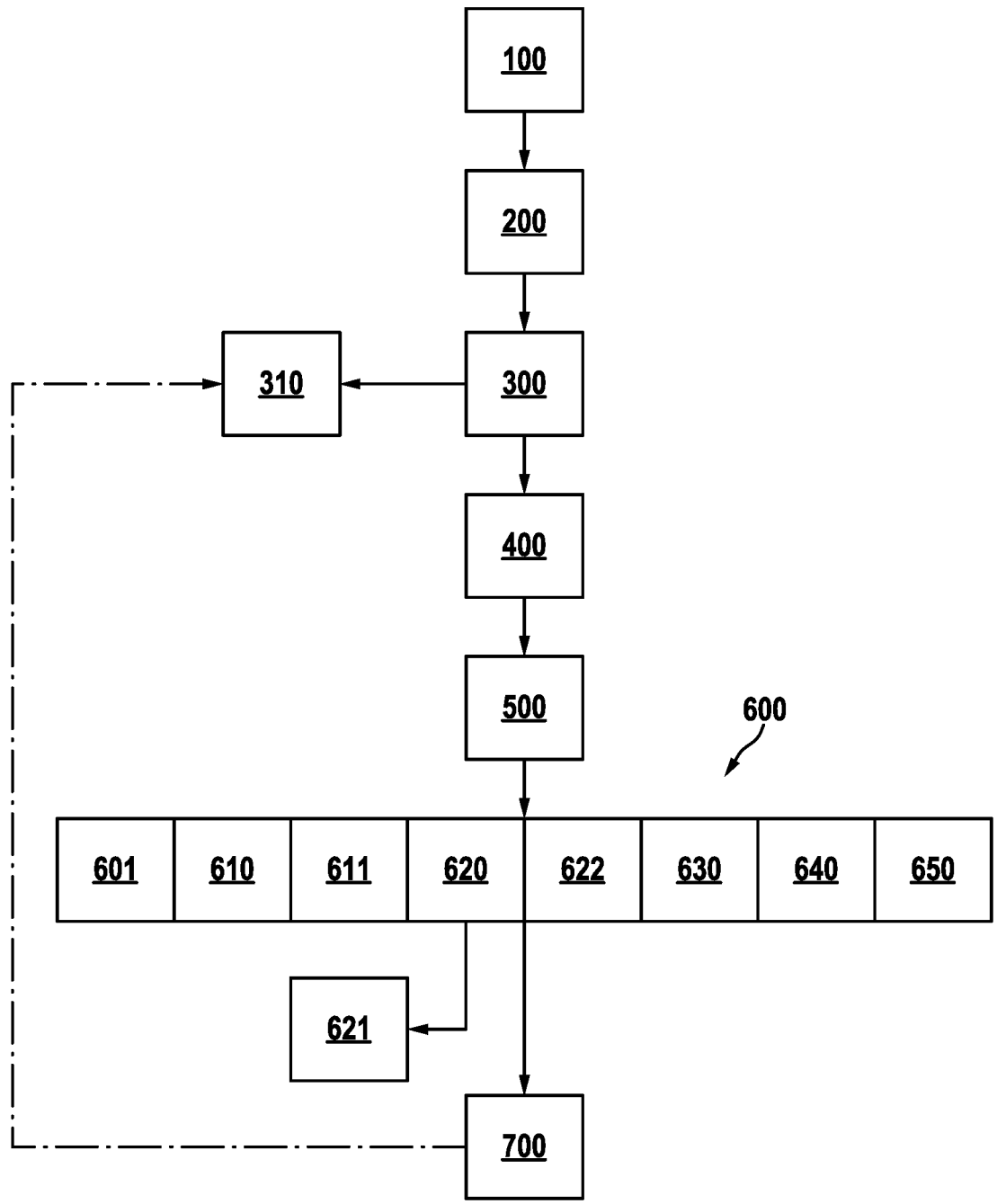

optically detecting an actual arrangement of the electrical components on the mounting plate and matching the location information and orientation information to the actual arrangement; and automatically wiring the electrical components in a wiring order and according to the wiring information and the matched location information and orientation information.

19 Claims, 10 Drawing Sheets

(51) Int. Cl.
  *H02B 1/20* (2006.01)
  *H02G 1/00* (2006.01)

(56) References Cited

U.S. PATENT DOCUMENTS

| | | | |
|---|---|---|---|
| 2018/0108458 | A1 | 4/2018 | Maki et al. |
| 2020/0388997 | A1 | 12/2020 | Bachler |
| 2022/0281116 | A1 | 9/2022 | Bächler |

FOREIGN PATENT DOCUMENTS

| | | | |
|---|---|---|---|
| CN | 104217046 | A | 12/2014 |
| CN | 107834338 | A | 3/2018 |
| CN | 207938955 | U | 10/2018 |
| DE | 4413577 | A1 | 10/1995 |
| DE | 4431254 | A1 | 3/1996 |
| DE | 10119227 | A1 | 10/2002 |
| DE | 10-2004-036819 | A1 | 3/2006 |
| DE | 10-2006-035892 | A1 | 1/2008 |
| DE | 102012016133 | B4 * | 9/2014 ........... H01R 25/142 |
| DE | 102013220798 | A1 | 4/2015 |
| DE | 102015103444 | A1 | 9/2016 |
| EP | 0259394 | B1 | 8/1991 |
| EP | 0703646 | B1 | 6/1999 |
| EP | 0924818 | A2 | 6/1999 |
| EP | 0917259 | B1 | 8/2001 |
| EP | 1468791 | B1 | 5/2012 |
| EP | 2783802 | A2 | 10/2014 |
| EP | 3392987 | A1 | 10/2018 |
| JP | H08140233 | A | 5/1996 |
| JP | H09282957 | A | 10/1997 |
| JP | 2003031335 | A | 1/2003 |
| JP | 2003091566 | A | 3/2003 |
| JP | 2010172169 | A | 8/2010 |
| RU | 2647879 | C2 | 3/2018 |
| WO | 2007-121729 | A2 | 11/2007 |
| WO | 2018104078 | A1 | 6/2018 |
| WO | 2018193754 | A1 | 10/2018 |
| WO | WO-2018184832 | A1 | 10/2018 |

OTHER PUBLICATIONS

System Robot Automazione. "Syndy, The independent solution", Visano, Italy, Mar. 31, 2012 (Mar. 31, 2012), pp. 1-16, Retrieved from the Internet: <http://www.systemrobot.it/en/crlines/wiring-syndy> [retrieved on Jan. 9, 2019] XP055539797 pp. 9, 13, 1.

International Search Report (in English and German) and Written Opinion of the ISA (in German) issued in PCT/DE2019/101019, mailed Feb. 4, 2020; ISA/EP.

German International Preliminary Report on Patentability issued in PCT/DE2019/101019, dated Mar. 11, 2021.

* cited by examiner

METHOD FOR WIRING ELECTRICAL COMPONENTS OF AN ELECTRICAL SWITCHGEAR ARRANGED ON A MOUNTING PLATE

CROSS-REFERENCE TO RELATED APPLICATIONS

This application is a U.S. National Phase Application under 35 U.S.C. 371 of International Application No. PCT/DE2019/101019, filed on Nov. 27, 2019, which claims the benefit of German Application No. 10 2018 133 337.4, filed on Dec. 21, 2018. The entire disclosures of the above applications are incorporated herein by reference.

BACKGROUND

This section provides background information related to the present disclosure which is not necessarily prior art.

TECHNICAL FIELD

The invention relates to a method for wiring electrical components of an electrical switchgear arranged on a mounting plate.

DISCUSSION

In the manufacture of switchgear and control systems, the wiring of the electrical components is one of the central and most time-consuming operations, which is still largely carried out manually. Not only the high complexity of this work process, but above all the demand for one hundred percent faultlessness places great demands on the employee carrying out the wiring.

There are various technical aids in different support levels for optimising the wiring process. These range from hand tools and/or semi-automatic machines for cable assembly to fully automatic systems that completely assemble individual wires, i.e. cut to length, strip, apply wire end ferrules and crimp. The pre-assembled cables produced in this way can then be output as loose and individual wires, as sequentially interconnected or strung wires, or as wire bundles. A cable sequence wound onto a reel is known from DE 10 2015 103 444 A1. BE 101 965 1 A describes a multifunctional processing head integrated into the end effector of a wiring system. DE 44 31 254 A1 and EP 0917259 B1 each describe a method and a device for wiring connection points of components of electrical devices. EP 0259394 B1 describes a tool for laying cables.

SUMMARY

This section provides a general summary of the disclosure, and is not a comprehensive disclosure of its full scope or all of its features.

It is therefore one aspect of the invention to further develop a method of the kind described above in such a way that it has the highest possible degree of automation.

Accordingly, the method comprises:

Providing a design of a switchgear comprising at least location information and orientation information about a plurality of electrical components of the switchgear on a mounting plate and wiring information about a plurality of electrical wirings between every two of the electrical components;

Optically detecting an actual arrangement of the electrical components on the mounting plate and matching the location information and orientation information to the actual arrangement; and Automatically wiring the electrical components in a wiring order according to the wiring information and the matched location information and orientation information.

The design of the switchgear, i.e. in particular the location information and orientation information about the plurality of electrical components of the switchgear as well as the wiring information relating to the wiring of the components, can for example be provided directly from a 3D-ECAD system. This system can also be used to obtain supplementary information concerning the electrical switchgear, insofar as it can support the wiring. This information may include, for example, individual assembly of individual cables of the wiring. Determining a degree of automation of the wiring may comprise determining an automation suitability of individual wiring steps in which two electrical components of the electrical switchgear are wired together in each case.

The optical detection may comprise a presence check of the plurality of electrical components of the switchgear, in that the optical detection comprises a component recognition of the components of the actual arrangement of the electrical components and a matching of the recognised components with the plurality of electrical components of the switchgear according to the design.

The provision of the design and the application of the test routine to the wiring information as well as, if necessary, the adaptation of the wiring information to maximise the degree of automation can be carried out computer-aided and therefore basically independent of location and therefore does not necessarily have to be carried out on an automatic wiring machine provided for the wiring, for example. The adapted wiring information can be imported to the wiring system, for example, by manual call-up at an automatic wiring machine or by automatic identification by reading in a product identification code, for example an RFID chip.

The optical detection of an actual arrangement of the electrical components on the mounting plate may comprise scanning a mounting plane of the mounting plate on which the electrical components are arranged. The scanning may be performed by means of a robot, for example a jointed-arm robot comprising a multifunctional end effector with an optical detection device, for example a camera or a scanner. The articulated robot can scan the mounting plate plane line by line with the camera. The camera can also be arranged immovably or movably above the mounting plate. With the aid of the optically detected actual arrangement of the electrical components, actual data on the local arrangement of the electrical components on the mounting plate level can be recorded and compared with the target data contained in the design of the switchgear, the location information and orientation information of the design. It can be provided that if a tolerance value for the local arrangement of one or more components is exceeded, an adjustment of the location information and orientation information to the actual arrangement of the components is carried out. The optical detection of the actual arrangement of the electrical components may comprise the optical detection of an individual identification of the electrical components. However, the identification of the electrical components may also be performed using common image recognition methods in which individual components of the electrical switchgear are inferred from the geometry of the detected components and a relative arrangement of different components to each other on the mounting plane.

The method may further comprise applying a test routine to the wiring information to determine a degree of automation of the wirings and, if necessary, adjusting the wiring information to maximise the degree of automation, wherein the automated wiring of the electrical components is performed according to the adjusted wiring situation. The method may further comprise reporting at least one non-automatable wiring to the design, for example an ECAD system. Thereupon, non-automatable wiring may be adapted to be automatable. This may include selecting an alternative cable routing or an alternative electronic component, such as a component having a cable terminal that is freely accessible to an articulated arm robot.

Automated wiring may further comprise removing a pre-terminated or an un-terminated cable with a robot, preferably an articulated arm robot, from a transfer interface for providing pre-terminated or un-terminated cables. The transfer interface can be an output of an automatic cable assembly machine, or a separate device on or at which a cable sequence of individually preassembled cables are arranged or provided in a defined wiring sequence in order to be able to remove them from or from the device mechanically and fully automatically, for example with the aid of a robot.

Alternatively or additionally, the automated wiring may comprise the removal of an at least partially pre-assembled or an unassembled cable with a robot, preferably with an articulated robot, from a transfer interface for the transfer of the at least partially pre-assembled or unassembled cables. In this case, the removal of the at least partially pre-assembled cable may comprise the removal of a cable cut to a specific length from the transfer interface of an automatic cable cutting machine. After removing the cable from the transfer interface, the method can comprise the assembly of at least one at least partially preassembled or one unassembled end of the cable, for which purpose the cable end is fed with the robot to an automatic cable end processing machine and removed again by the latter after the cable end treatment has been completed.

The robot can have a multifunctional end effector with an optical system for locating the actual positions of cables and/or electrical components or for detecting wiring positions on the mounting plate. The end effector may further comprise a gripper with an integrated sensor system for picking up individual wires and for contacting, routing and performing a pull-off check. The end effector may further comprise a tool for electrically testing the contacted wire connection, for example an ohmmeter or a current continuity meter.

The use of an articulated arm robot with a multi-functional end effector enables the pick-up, feeding and contacting of cables in a vertical direction with respect to the mounting plane of the mounting plate, in a horizontal direction, i.e. parallel to the mounting plane of the mounting plate, or also in any oblique angle between the two aforementioned orientations, i.e. for example in an angular range between 1° and 89° with respect to the mounting plane of the mounting plate. The articulated arm robot can be a single-armed robot or a two-armed articulated arm robot, whereby the two-armed articulated arm robot can be realised as two separate robots or can be a single robot having two arms.

Providing the design of the switchgear may comprise obtaining a corresponding design data set from an ECAD system. Prior to the wiring, the method may further comprise an assembly process, which may also be automated, in which the mounting plate is equipped with the electrical components to be wired according to the design of the switchgear, in particular according to the ECAD data set.

The method may further comprise issuing at least one wiring instruction, the wiring instruction being an instruction to perform a manual wiring step identified as a wiring step that is not automatable when applying the test routine to the wiring information. The manual wiring step may be computerised, as described in EP 3392987 A1.

The automated wiring step may comprise sequentially producing a plurality of individually pre-assembled cables in the wiring order used to wire the electrical components, and providing the individually pre-assembled cables via a transfer interface for processing pre-assembled cables. The method can preferably have the production and provision of the pre-assembled cables "in time", so that the storage of cable bundles and other cable sequences as well as the handling of the same at the manufacturer of the bundles and, if necessary, a transport to the switchgear manufacturer is not required.

For example, it can be provided that simultaneously with a first wiring step, in which a first electrical connection between two of the electrical components is established with a first of the individually preassembled cables, a second individually preassembled cable is established for a second wiring step immediately following the first and is made available via the transfer interface.

The transfer interface may be, for example, an output of a cable assembly device. However, the transfer interface can also be a separate holder for pre-assembled cables, in which the pre-assembled cables are provided in sequence and with defined orientation and removal position, for example for an articulated arm robot, after corresponding pre-production.

The removal may comprise gripping a first pre-assembled cable end of the pre-assembled cable with the robot and feeding as well as electrically contacting the first pre-assembled cable end at a cable connection point of a first of the electrical components. For this purpose, the robot can have a multifunctional end effector with a gripper which has, for example, a receiving geometry which is adapted to an outer geometry of a ferrule or the like of the preassembled cable and also has an insertion aid, for example a cone, with the aid of which the cable end is inserted into a socket of the cable connection point of the electrical component.

After contacting the first pre-assembled cable end, the second pre-assembled cable end of the cable can be fed to a cable connection point of a second of the electrical components and contacted at this.

The feeding and contacting of the first and second cable ends may be performed by the same robot, wherein the robot releases or disengages the pre-assembled cable from a gripper with which it has gripped the first cable end of the cable after the first cable end has been contacted, to subsequently transport the pre-assembled cable from the first to the second cable end through the gripper to subsequently grip the second pre-assembled cable end and thereafter feed it, for example, to a further electrical component for contacting.

The sequential production of a plurality of individually pre-assembled cables in the wiring sequence may comprise the production of the individually pre-assembled cables with at least one automatic cable assembly machine. In this regard, the plurality of individually pre-assembled cables may be sequentially transferred to the at least one robot, preferably the at least one articulated arm robot, via a transfer interface.

The automated wiring may comprise prefabricating a plurality of cables in the wiring order and according to the wiring information, for which purpose a robot, preferably an articulated arm robot, grips an unassembled or only partially preassembled first cable end, feeds the first cable end to an automatic cable assembly machine, whereupon the first cable end receives an assembly, preferably a wire end treatment, and wherein the robot subsequently feeds the assembled first cable end to a first one of the electrical components and electrically contacts it.

After pre-assembling the first cable end and before feeding and contacting the first cable end, the robot can grip the second cable end and feed it to an automatic cable assembly machine, whereupon the second cable end receives an assembly, preferably a wire end treatment.

The removal of a pre-assembled or unassembled cable with a robot may comprise the removal of a first cable end of the cable with a first robot and the removal of a second cable end of the cable with a second robot, so that the cable is held at its two ends by different robots.

The two robots, which are again preferably articulated robots, may be operated in a master-slave mode until one of the two cable ends is contacted, the master robot feeding the cable end to be wired first before the other cable end to one of the electrical components, while the slave robot feeds the cable end to be wired subsequently. The two robots may be implemented as a single two-armed robot or as two separate robots.

The tracking may comprise holding the cable end to be subsequently wired at a minimum distance from the mounting plane of the mounting plate and/or tightening the cable end to be subsequently wired when the cable is slack and/or holding the cable end to be subsequently wired under a mechanical bias.

Automated wiring may comprise, after a cable end has been fed to and electrically contacted with an electrical component, performing a pull-off control. For this purpose, a robot with a tensile force-sensitive gripper, which is implemented, for example, in the functional scope of a multifunctional end effector of a jointed-arm robot, can engage the contacted cable end and apply a predetermined pull-off force to the cable end against a contacting direction of the cable end, wherein proper contacting of the cable end is assumed if the contacting withstands the predetermined pull-off force. The pull force sensitive gripper may be attached to a robot arm via a flange, the flange having a force-torque sensor. Alternatively, the robot may have a torque sensor in at least one robot arm joint.

The wiring information may comprise, per wiring of two of the electrical components, at least one cable routing, including a cable source coordinate, a cable destination coordinate and a routing path between the cable source coordinate and the cable destination coordinate, and at least one cable condition, preferably a cable length, a cable cross-section, a cable colour, a wire end treatment and/or a cable marking or the like.

In providing a design of the switchgear, component information may further be provided from the design, preferably at least one dimension of the mounting plate, a type of at least one of the electrical components or another component of the electrical switchgear, at least one connection type of at least one of the electrical components, a connection coordinate of at least one of the electrical components, or a geometry of at least one of the electrical components.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
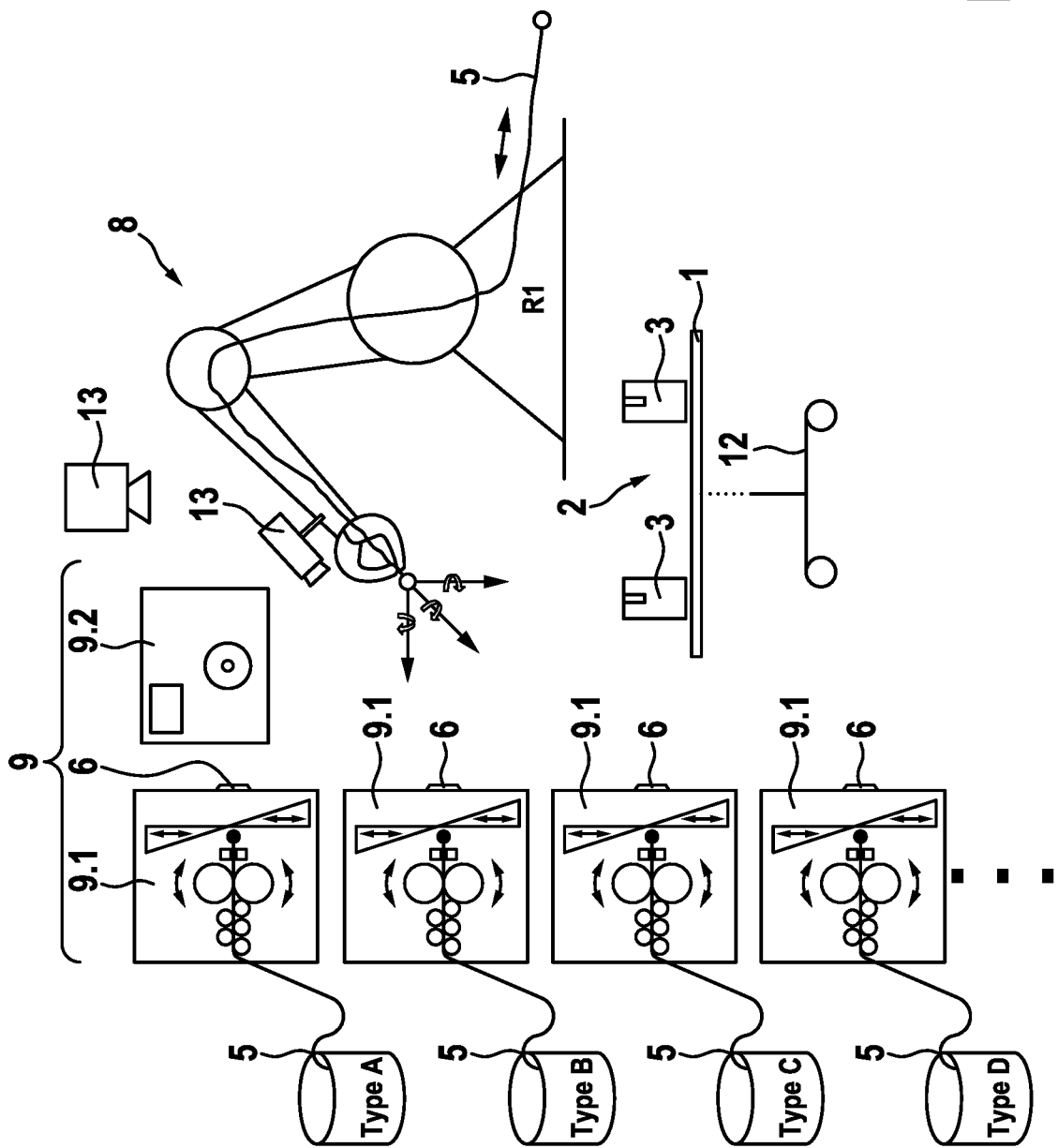
Figure 3:
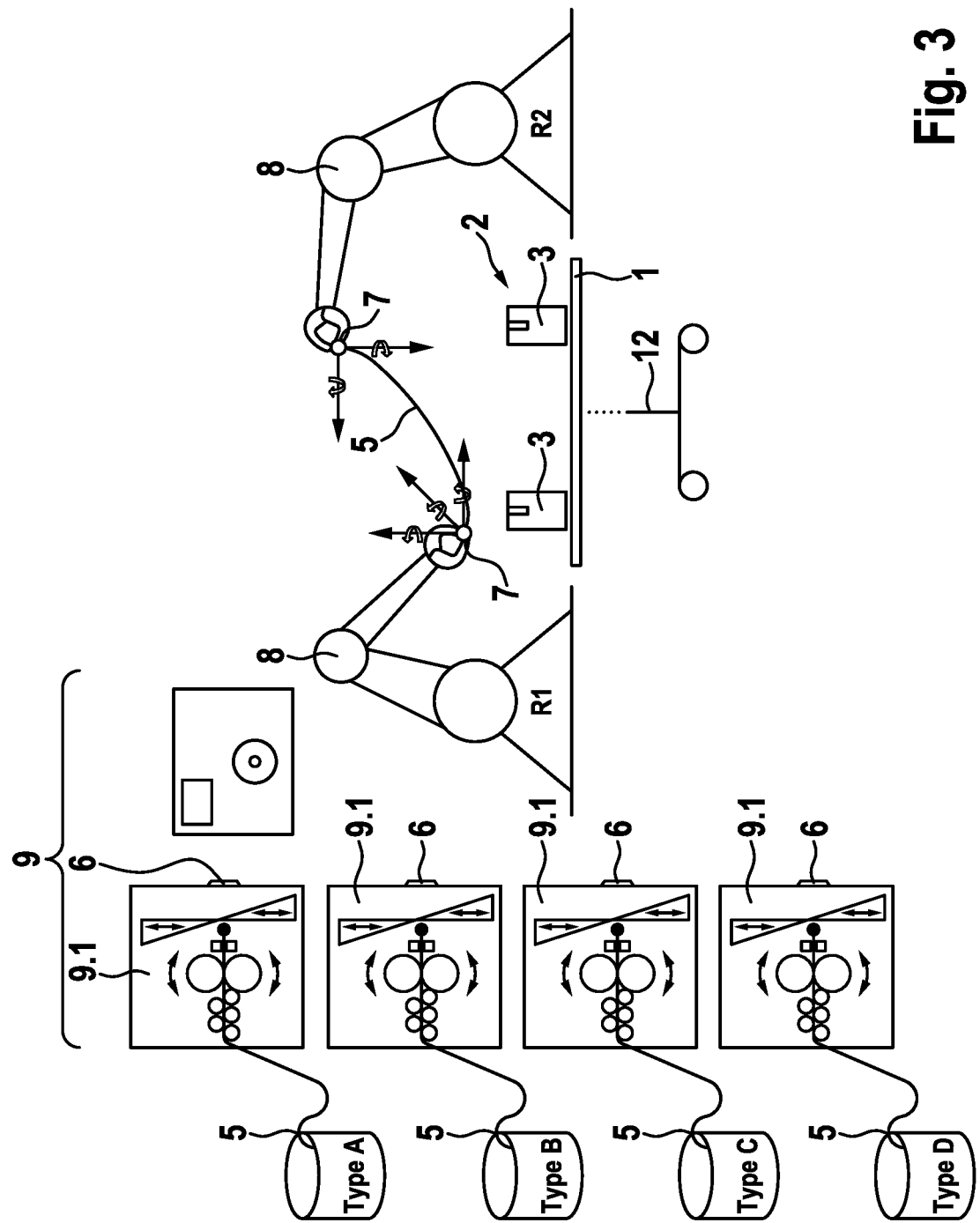
Figure 4:
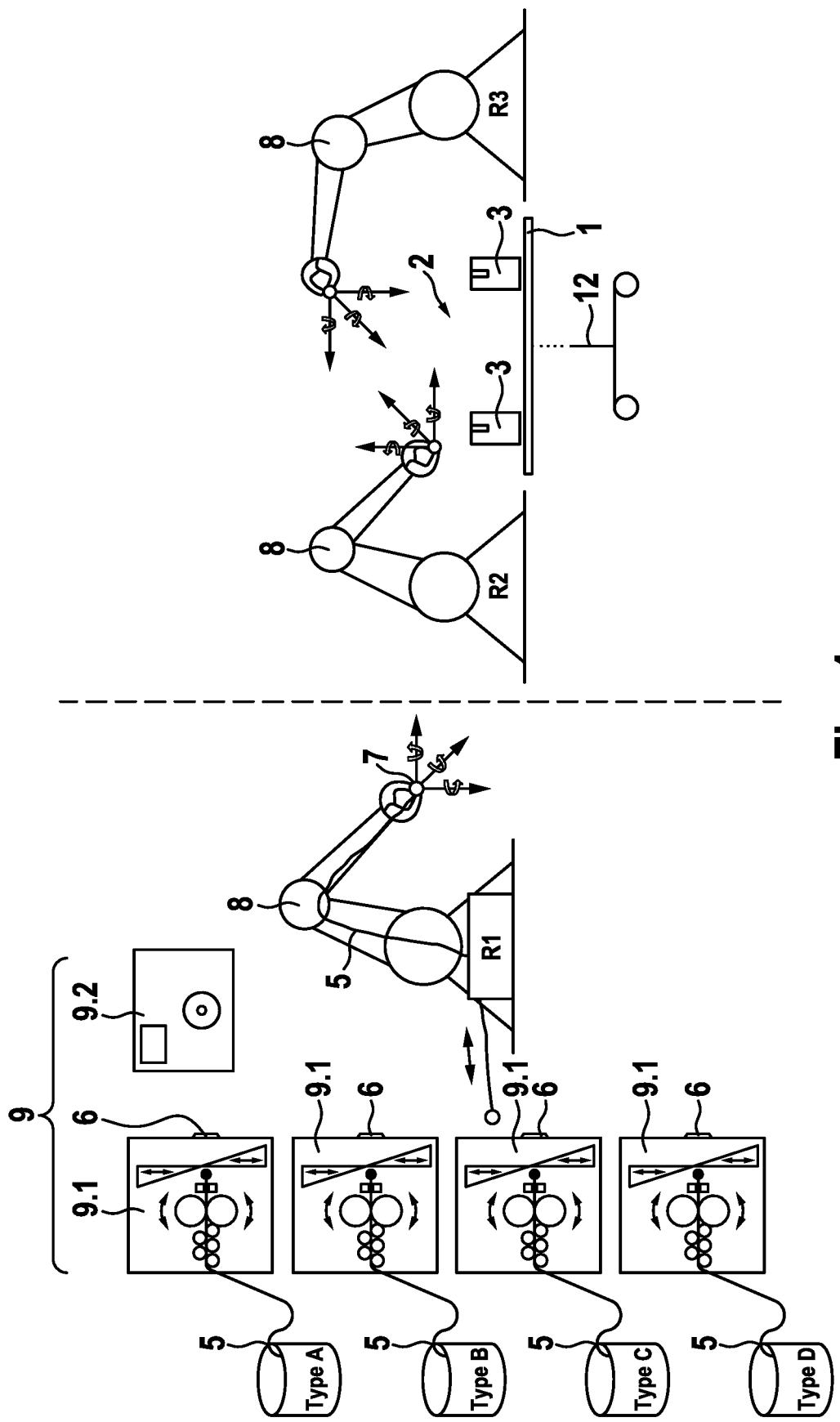
Figure 5:
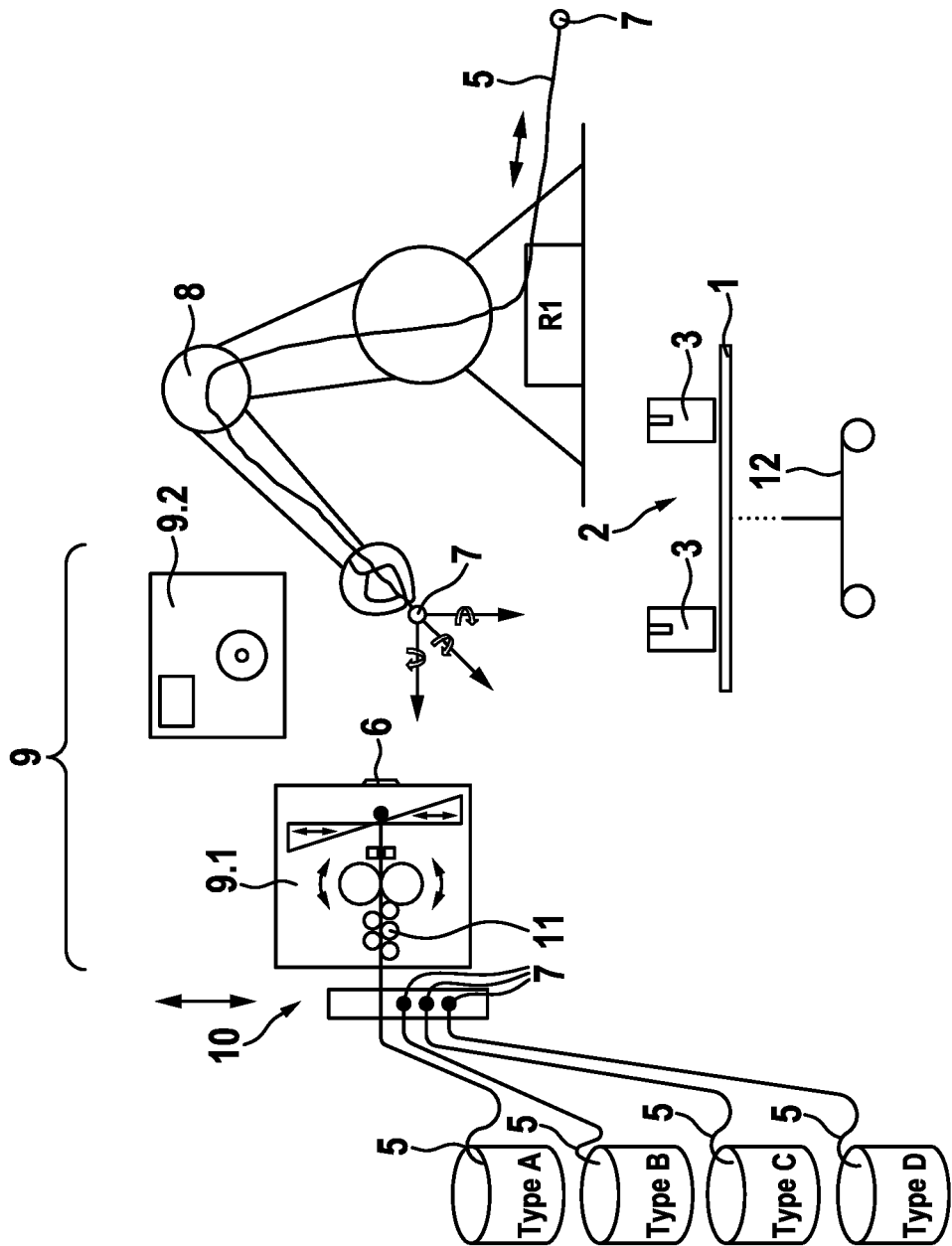
Figure 6:
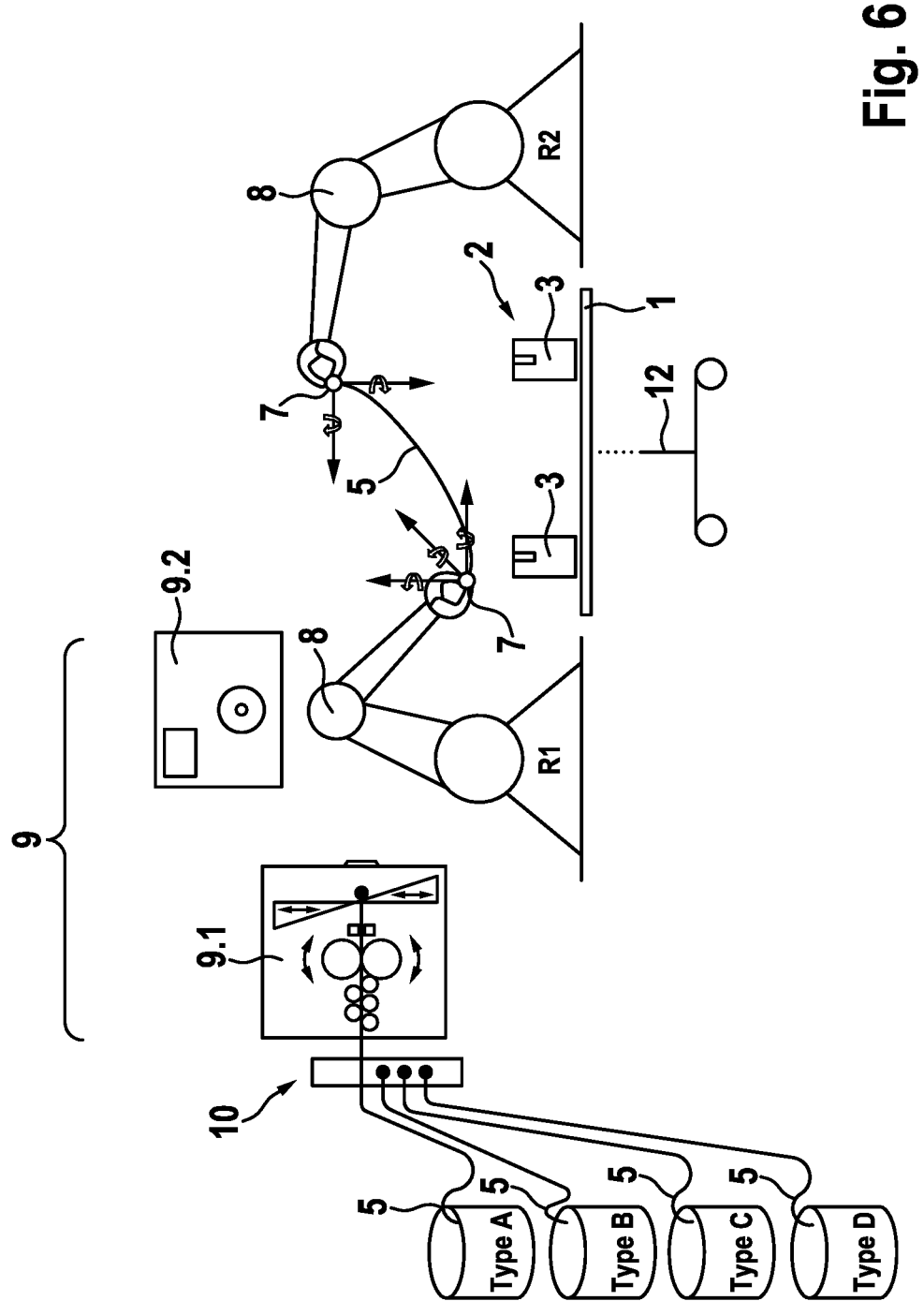
Figure 7:
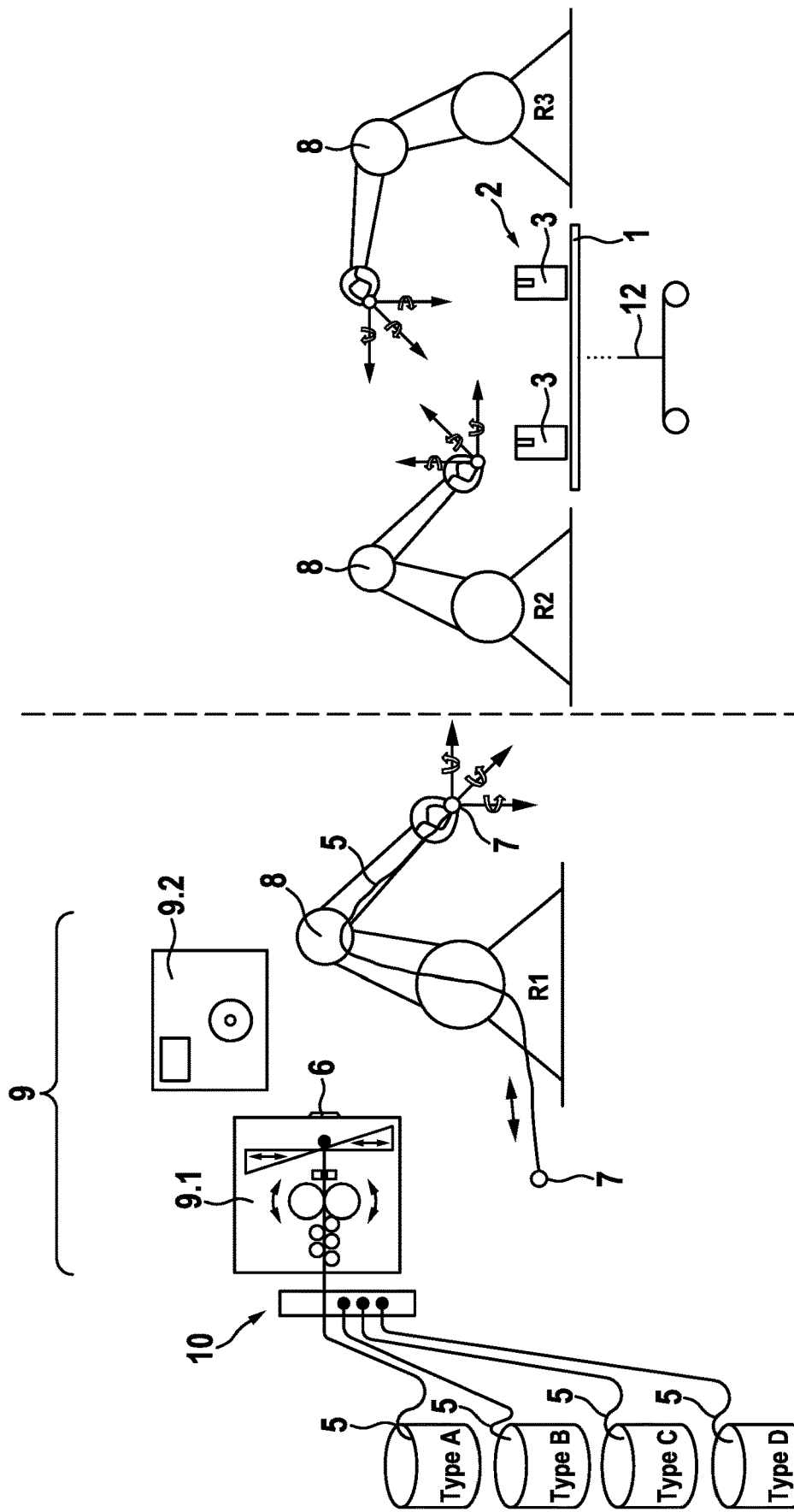
Figure 8:
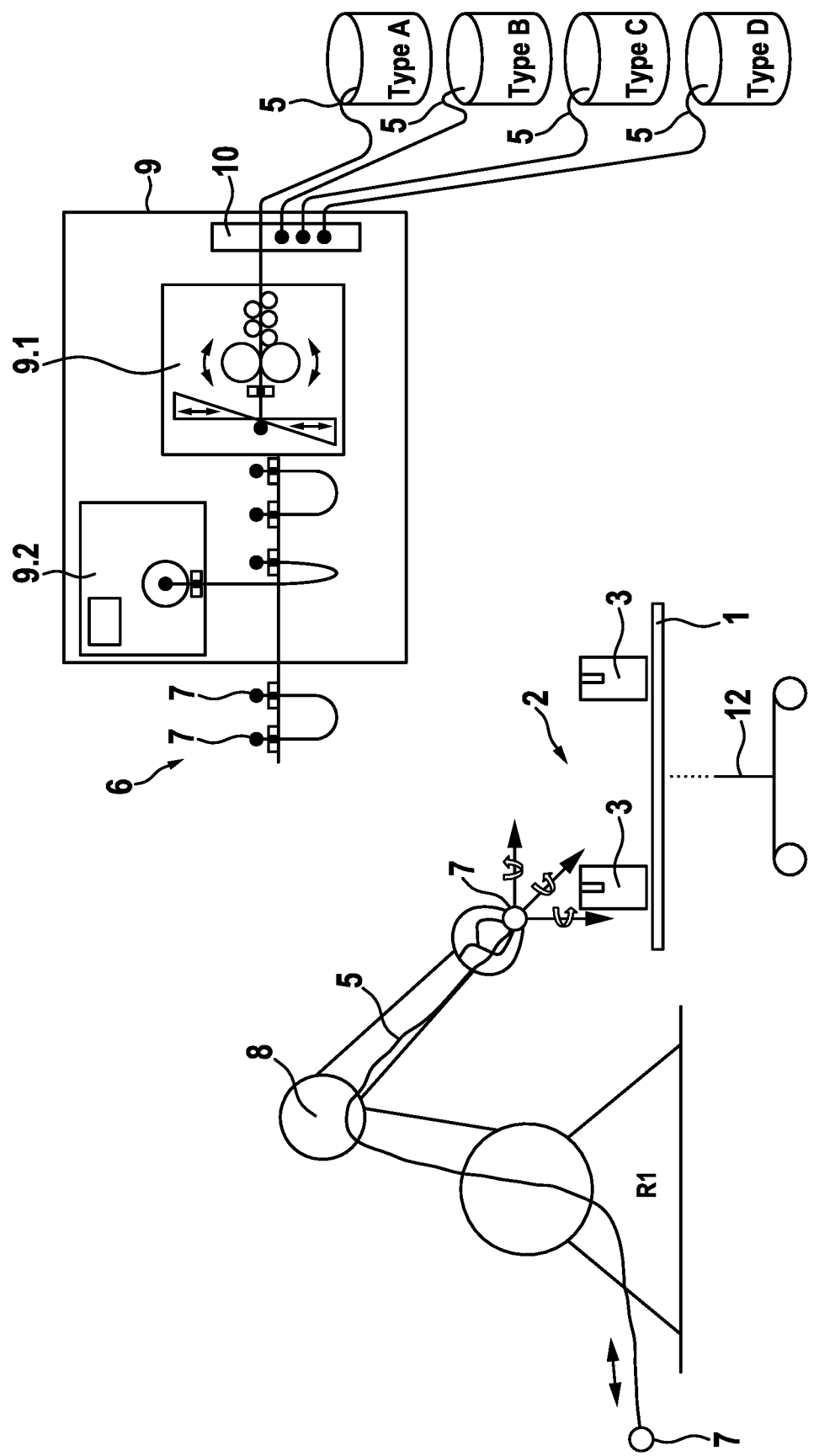
Figure 9:
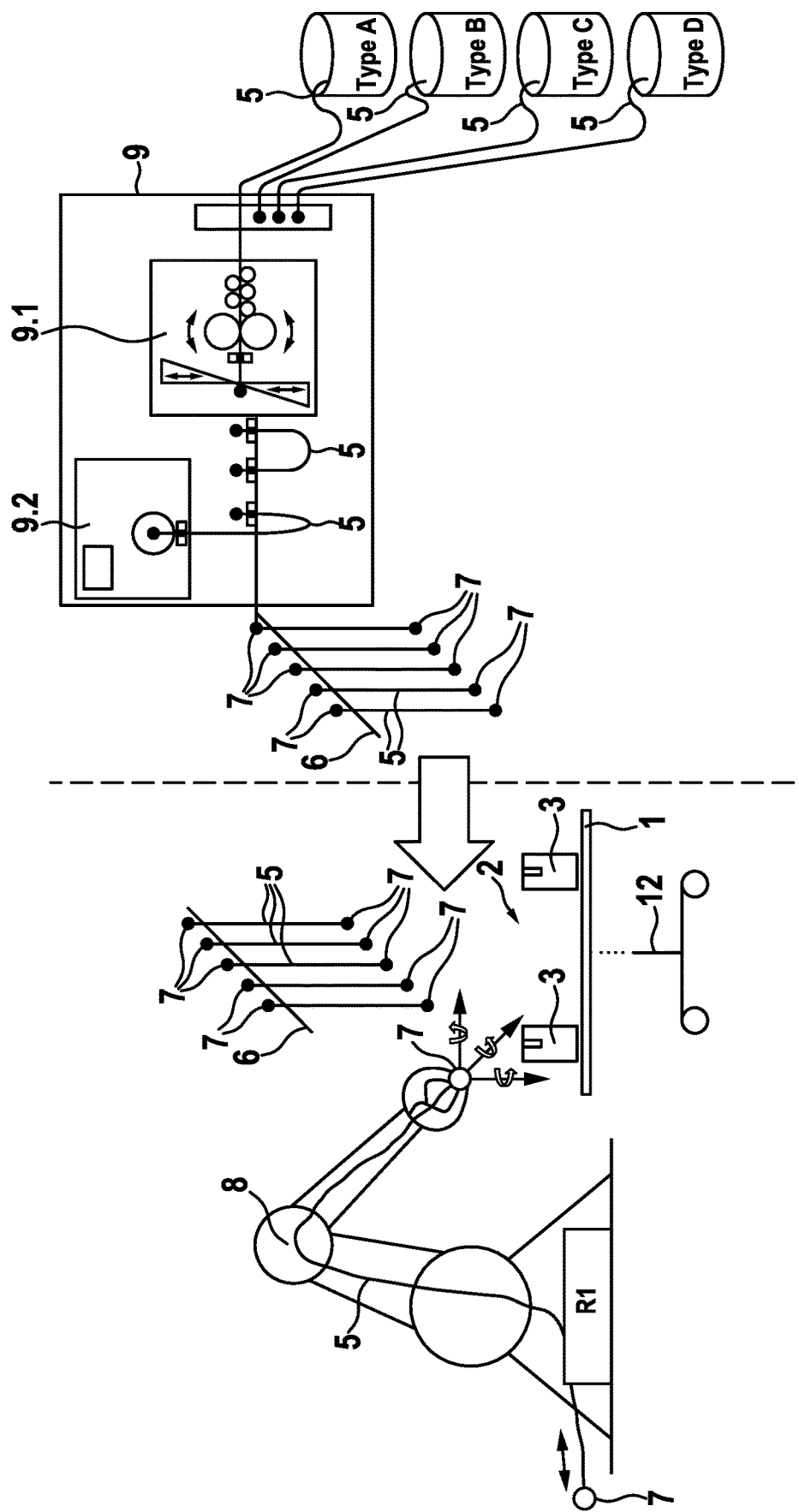
Figure 10:
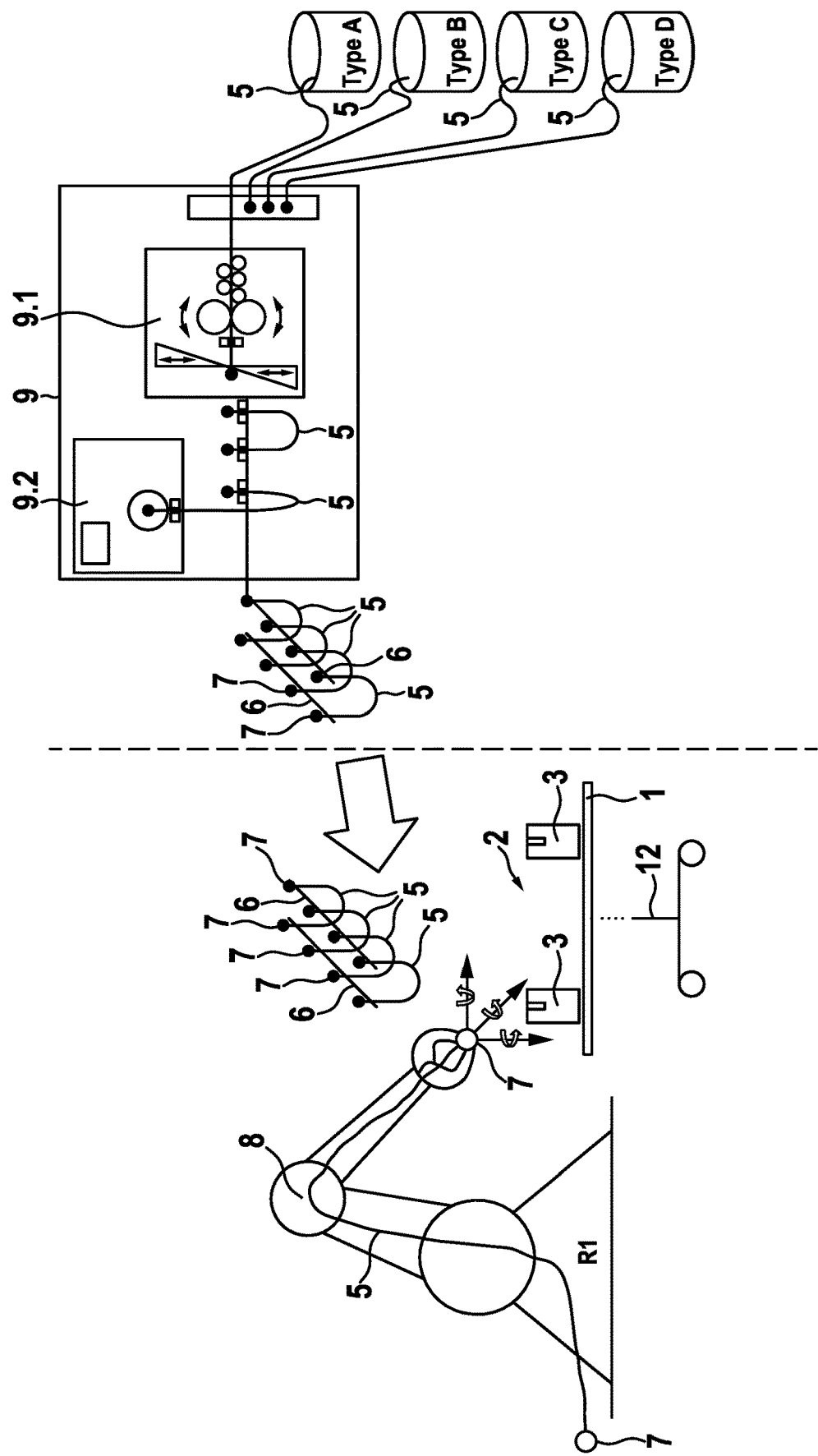

Further details of the invention are explained with reference to the figures below. Thereby:

FIG. 1 schematically shows a flow chart of an embodiment of a method according to the invention;

FIG. 2 shows a first embodiment of an exemplary device for carrying out a method according to the invention;

FIG. 3 a second embodiment of an exemplary device for carrying out the method according to the invention;

FIG. 4 a third embodiment of an exemplary device for carrying out the method according to the invention;

FIG. 5 a fourth embodiment of an exemplary device for carrying out the method according to the invention;

FIG. 6 a fifth embodiment of an exemplary device for carrying out the method according to the invention;

FIG. 7 a sixth embodiment of an exemplary device for carrying out the method according to the invention;

FIG. 8 shows a seventh embodiment of an exemplary device for carrying out the method according to the invention;

FIG. 9 an eighth embodiment of an exemplary device for carrying out the method according to the invention; and FIG. 10 is a ninth embodiment of an exemplary device for carrying out the method according to the invention.

DETAILED DESCRIPTION

Example embodiments will now be described more fully with reference to the accompanying drawings.

In the method according to the invention as shown in FIG. 1, in a first step 100, a design of a switchgear is provided which comprises at least location information and orientation information about a plurality of electrical components of the switchgear on a mounting plate and wiring information about a plurality of electrical wirings between each two of the electrical components.

In a subsequent step 200, a test routine is applied to the wiring information in order to determine a maximum realisable degree of automation of the wiring, for example, taking into account the functional scope of a device available for carrying out the wiring method. Thereupon, the wiring information can be adapted, if necessary, in order to achieve a maximisation of the degree of automation, for example, taking into account the device available for carrying out the wiring method. The adaptation of the wiring information is described in step 300. Wiring steps that cannot be automated may be discarded for the manual wiring 310, so that they are not considered in the automated wiring. The manual wiring step 310 may be computerised, as described in EP 3392987 A1. The manual wiring 310 may be performed after a pull-off check 700 has been performed, or after the wiring, to the extent that it can be automated, is complete.

The method may further comprise optically detecting 400 an actual arrangement of the electrical components on a mounting plate provided for wiring with a camera 13 mounted on the robot 8 or a camera 13 mounted above the mounting plate 1, and matching 500 the location information and orientation information to the actual arrangement. The optical sensing 400 may comprise scanning the mounting plane of the mounting plate with a laser profile measurement system and/or using common image recognition techniques. The method may further comprise generating at least one code or at least one robot or machine control to perform the wiring.

Subsequently, in a step 600, the automatic wiring of the electrical components may be performed in a predetermined wiring order and taking into account the—possibly adjusted—wiring information and the adjusted location information and orientation information. Wiring 600 may comprise removing 610 an at least partially pre-terminated cable or an un-terminated cable with a robot from a transfer interface. Wiring 600 may alternatively or additionally comprise sequentially producing 620 a plurality of individually pre-assembled cables in wiring order, optionally "in-time" with wiring 600, so that the next cable to be wired is always provided for pick-up at the transfer interface.

The automated wiring 600 may comprise the removal 610 of an at least partially pre-assembled or an unassembled cable with a robot, preferably with an articulated robot, from a transfer interface for the transfer of the at least partially pre-assembled or unassembled cables.

Removing 610 an at least partially pre-assembled cable may comprise removing a cable cut to a predetermined length from the transfer interface of an automatic cable cutting machine.

After the removal 610 of the cable from the transfer interface, the method can further comprise the assembly 611 of at least one at least partially preassembled or one unassembled end of the cable, for which purpose the cable end is fed with the robot to an automatic cable end processing machine and is removed again by the latter after the cable end treatment has been completed.

Removing 610 may comprise gripping 630 a first pre-terminated cable end of the pre-terminated cable, and feeding 640 and electrically contacting 650 the first pre-terminated cable end to a cable connection point of a first electrical component.

The method may further comprise sequentially transferring 622 a plurality of individually pre-assembled cables via a transfer interface to at least one robot, preferably configured as an articulated robot.

Similarly, the automated wiring 600 may comprise pre-assembling 601 a plurality of cables in the wiring order and taking into account wiring information. For example, the wiring information may comprise at least one cable routing and at least one cable condition, preferably a cable length, a cable cross-section, a cable colour, a wire end treatment and/or a cable marking, for each wiring of two electrical components.

After a cable end has been supplied to and electrically contacted with an electrical component, the method may comprise performing a pull-off control 700, for which purpose a robot engages the contacted cable end, for example with a tensile force-sensitive gripper, and applies a predetermined pull-off force to the cable end against a contacting direction of the cable end. Proper contacting of the cable end can be assumed if the contacting withstands the predetermined pull-off force and, in particular, decontacting of the cable end does not occur. The method may further comprise, in the step 700 or in a separate step, in addition to the pull-off check, an electrical test of one of the generated wire connections. This may comprise determining an electrical contact resistance.

Removing 610 a pre-assembled or unassembled cable with a robot may comprise removing 610 a first cable end of the cable with a first robot and removing 610 a second cable end of the cable with a second robot. Thus, the cable is held at its two ends by different robots. In this embodiment, the two robots can be operated in a master-slave mode until one of the two cable ends is contacted, in which the master robot feeds the cable end to be wired first before the other cable end to one of the electrical components, while the slave robot feeds the cable to be wired subsequently in the simultaneously executed step 621.

The tracking 621 may comprise holding the cable end to be subsequently wired at a minimum distance from a mounting plane of the mounting plate and/or tightening the cable end to be subsequently wired if the cable is slack and/or holding the cable end to be subsequently wired under a mechanical bias.

FIGS. 2 to 10 show exemplary embodiments for devices for carrying out the method according to the invention for wiring electrical components 3 of an electrical switchgear 2 to be formed on a mounting plate 1. The mounting plate 1 is held in exemplary horizontal alignment by a mounting plate handling trolley 12, so that the components 3 can be accessed from above via a robot 8 for the purpose of cable feed and cable connection. Depending on the embodiment, the mounting plate 1 can alternatively be arranged at an angle to the horizontal.

The exemplarily described devices for carrying out the method according to the invention may be connected to an ECAD system, via which a design of the switchgear is provided, if necessary the test routine is applied to the wiring information and thereupon the wiring information is adapted to maximise the degree of automation. The application of the test routine to the wiring information and the adjustment of the wiring information to maximise the degree of automation can also be performed independently of the ECAD system on a separate computer system that interfaces with both the ECAD system and the electrical component wiring device. The computer system can then obtain the switchgear design from the ECAD system, apply the test routine to the wiring information, and make any necessary adjustments to the wiring information.

The device for performing the wiring operation may comprise a multifunctional end effector with an optical detection device for optical detection of the actual arrangement of the electrical components on the mounting plate. After the actual arrangement of the electrical components is detected by the optical detection means of the multifunctional end effector, this information may be used to perform alignment of the location information and orientation information with the actual arrangement by the computer system, if necessary. The computer system then sends a correspondingly adapted design of the switchgear or a machine control programme generated therefrom to the device for wiring the electrical components, so that the device can carry out the automated wiring of the electrical components in a predetermined wiring sequence, which may have been revised by the computer system as part of the adaptation of the wiring information to maximise the degree of automation.

In the embodiment of the device shown in FIG. 2, a plurality of automatic cable cutters 9.1 each provide cables of a specific type A-D and each of a specific length. The cable types A-D can differ, for example, in the cable cross-section, in the cable colour or in another cable feature. In principle, the invention is not limited to a certain number of cable types. Preferably, however, at least two cable types differing in at least one cable feature should be provided. All cable features, including the cable length, can be taken from the design of the switchgear, for example in the form of a design file provided by the ECAD system.

The single-arm articulated robot 8 takes off directly from an interface 6 of the automatic cable cutting machine 9 providing the cable 5 of the desired type in order to feed the cut cable 5 for the wire end treatment of the intended type to the automatic wire end treatment machine 9.2 one after the other with both ends 7 for the respectively required post-treatment. The post-treatment can in particular comprise stripping, applying a wire end ferrule and crimping the wire end ferrule.

After the end-of-core treatment, the single-arm articulated robot 8 can process the pre-assembled cable 5 thus obtained on the mounting plate 1 in accordance with the design of the switchgear 2 in the manner described with reference to FIG. 1, in particular wire components 3 of the switchgear 2 in accordance with a design of the switchgear 2.

The embodiment shown in FIG. 3 differs from the embodiment shown in FIG. 2 in that a two-armed articulated-arm robot 8 is used instead of a one-armed articulated-arm robot 8. The two-armed jointed-arm robot 8 can be implemented as two separate robots, as shown, or it can be a single robot having two arms. As far as the present application refers to a first and a second robot, in particular to a first and a second jointed-arm robot 8, this can also be realised by the two-arm jointed-arm robot 8 shown in FIG. 3. The two arms of the articulated robot(s) 8 can work together cooperatively as described with reference to FIG. 1. In particular, by operating the two robot arms in a master-slave mode in which a master robot arm 8 is provided for wiring a first cable end 7, while the slave robot arm 8 is provided for tracking the opposite cable end 7, for example in such a way that a certain minimum distance of the opposite cable end 7 from the mounting plate 1 is maintained, in order to avoid tangling of the cable 5 with electrical components 3 arranged on the mounting plate 1, or in order to favour the insertion of the cable 5 into a cable duct during the cable routing carried out by the robots between the two components 3 to be electrically contacted with each other.

The embodiment shown in FIG. 4 differs from the embodiment shown in FIG. 3 in that a further articulated-arm robot 8 is provided for producing in-time pre-assembled cables with the aid of the automatic cable assembly machines 9.1, 9.2 in the manner described above and for transferring them to the two-arm articulated-arm robot 8.

The embodiment shown in FIG. 5 shows the use of a wire changer 10, with the aid of which a single automatic cable cutting machine 9.1 is supplied as required with different types of cable of types A-D, which are obtained from different sources, for example from the cable drums shown. A transport system 11 of the automatic cable cutting machine 9.1 takes a wire end from the wire changer 10, which is provided at the wire changer 10 as required. The wire changer 10 is movable in relation to the transport system 11 between its different take-off points (illustrated by the vertical double arrow), so that a desired wire type A-D can be supplied to the automatic cable cutting machine 9.1 as required.

The embodiment according to FIG. 6 shows a variant of the embodiment according to FIG. 5, in which a two-armed articulated-arm robot 8 or two one-armed robots 8 is/are used instead of a one-armed articulated-arm robot 8. The guidance of the cable ends can be carried out under the conditions described with reference to FIG. 3.

FIG. 7 shows a variant of the embodiment according to FIG. 6, in which a separate single-arm articulated robot 8 is provided for removing the cut-to-length cables 5 from the automatic cable cutting machine 9.1 and for the end-of-core treatment of the cut-to-length cables 5 with the aid of the automatic end-of-core treatment machine 9.2. This passes the wire-end treated cables 5 on to two further collaborating single-arm articulated robots 8 for the wiring. The collaborative wiring process has been described with reference to FIG. 3.

FIG. 8 shows a further embodiment of a device according to the invention, in which a single-armed articulated-arm robot 8 obtains pre-assembled cables 5 provided via a cable assembly system 9. The cable assembly machine 9 has an automatic cable cutting machine 9.1, to which cable 5 of type A-D is selectively fed via a wire changer 10. The cut-to-length cable 5 is fed to an automatic wire-ending machine 9.2, which has an output via which the ready-made pre-assembled cables 5 are output individually, i.e. sequentially in a predetermined laying sequence. The pre-assembled cables 5 are flexible and are provided by the cable assembly machine 9 at an interface 6 in a U-shaped geometry. The cables 5 are held at their ends 7 so that the articulated-arm robot 8 can remove the assembled cable 5 from the cable assembly machine 9 via the cable ends 7 with a defined arrangement of the cable ends 7.

The embodiment shown in FIG. 9 differs from the embodiment shown in FIG. 8 in that the cable assembly machine 9 is provided separately from the device for carrying out the method. Consequently, the cable assembly machine 9 produces a transfer interface 6 in the form of a magazine with a plurality of preassembled cables 5, which are arranged in the transfer interface 6 in a predetermined wiring sequence with respect to one another and with a predetermined orientation, so that the jointed-arm robot 8 can remove the individual wires 5 from the magazine in a defined manner, for which purpose the magazine is aligned in a predetermined arrangement and orientation with respect to the jointed-arm robot 8. The jointed-arm robot 8 may further comprise a recognition device, for example an optical recognition device, to distinguish the individual wires 5 in the magazine.

Deviating from the embodiment shown in FIG. 9, the embodiment shown in FIG. 10 has a cable assembly device 9 in which the cable 5 is held at its two opposite ends 7 in the transfer interface 6 formed as a magazine and is thus arranged in a defined manner, facilitating the removal of the cables 5 with the aid of the articulated-arm robot 8.

The features of the invention disclosed in the foregoing description, in the drawings as well as in the claims may be essential to the realisation of the invention both individually and in any combination.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method for wiring electrical components of an electrical switchgear arranged on a mounting plate, comprising:

providing a design of the electrical switchgear comprising at least location information and orientation information about a plurality of electrical components of the electrical switchgear on a mounting plate and wiring information about a plurality of electrical wirings between every two of the electrical components;

optically detecting an actual arrangement of the electrical components on the mounting plate and matching the location information and orientation information to the actual arrangement;

automatically wiring the electrical components in a wiring order and according to the wiring information and the matched location information and orientation information, and wherein said optically detecting comprises a presence check of the plurality of electrical components of the electrical switchgear, in that said optically detecting comprises a component recognition of the actual arrangement of the electrical components and a matching of the recognised components with the plurality of electrical components of the switchgear according to the design.

2. The method according to claim 1, comprising applying a test routine to the wiring information to determine a degree of automation of the wirings and, if necessary, adjusting the wiring information to maximise the degree of automation, wherein the automated wiring of the electrical components is performed according to the adjusted wiring information.

3. The method according to claim 1, wherein the automated wiring comprises pre-assembling a plurality of cables in the wiring order and according to the wiring information, for which purpose a robot, grips an unassembled or only partially pre-assembled first cable end, feeding the first cable end to an automatic cable assembly machine, whereupon the first cable end receives a treatment, preferably a wire end treatment, and wherein the robot then feeds the assembled first cable end to a first of the electrical components and contacts it therewith.

4. The method according to claim 1, wherein the automated wiring, after a cable end has been fed to and electrically contacted with an electrical component, comprises performing a pull-off control, for which purpose a robot with a tensile-force-sensitive gripper engages the contacted cable end and applies a predetermined withdrawal force to the cable end counter to a contacting direction of the cable end, proper contacting of the cable end being assumed if the contacting withstands the predetermined withdrawal force.

5. The method according to claim 1, wherein the wiring information per wiring of two of the electrical components comprises at least one cable routing, including a cable source coordinate, a cable destination coordinate and a routing path between the cable source coordinate and the cable destination coordinate, and at least one cable condition.

6. The method according to claim 1, wherein in providing a design of the electrical switchgear, component information is further provided from the design of at least one dimension and/or contour of the mounting plate, a type of at least one of the electrical components or a further component of the electrical switchgear, a connection type of at least one of the electrical components, a connection coordinate of at least one of the electrical components, or a geometry of at least one of the electrical components.

7. The method according to claim 1, wherein the automated wiring comprises removing an at least partially pre-assembled or an unassembled cable with a robot, from a transfer interface for the transfer of the at least partially pre-assembled or unassembled cables.

8. The method according to claim 7, wherein said removing of an at least partially pre-assembled cable comprises removing of a cable cut to a certain length from the transfer interface of an automatic cable cutting machine.

9. The method according to claim 7, in which, after said removing of the cable from the transfer interface, the method further comprises assembling at least one at least partially pre-assembled or unassembled end of the cable, for which purpose the cable end is fed with the robot to an automatic cable end processing machine and is removed from the latter again after the cable end treatment has been carried out.

10. The method according to claim 1, wherein the automated wiring comprises sequentially manufacturing a plurality of individually pre-assembled cables in the wiring sequence with which the electrical components are wired, and providing the individually pre-assembled cables via a transfer interface for providing pre-assembled cables.

11. The method according to claim 10, in which, simultaneously with a first wiring step in which a first electrical connection between two of the electrical components is produced with a first of the individually pre-assembled cables, a second individually pre-assembled cable is produced for a second wiring step immediately following the first and is provided via the transfer interface.

12. The method according to claim 7, wherein said removing comprises gripping a first pre-assembled cable end of said pre-assembled cable with said robot and feeding and electrically contacting said first pre-assembled cable end at a cable connection point of a first one of said electrical components.

13. The method according to claim 12, wherein after contacting the first pre-assembled cable end, the second pre-assembled cable end of the cable is fed to a cable connection point of a second one of the electrical components and is contacted thereat.

14. The method according to claim 12, wherein said feeding and contacting of the first and second cable ends is performed by the same robot, for which purpose the robot releases or detaches the pre-assembled cable from a gripper with which it has gripped the first cable end of the cable, or releases the pre-assembled cable on a gripper with which it has gripped the first cable end, after the first cable end has been contacted, in order to subsequently transport the pre-assembled cable from the first to the second cable end through the gripper and in order to subsequently grip the second pre-assembled cable end.

15. The method according to claim 10, wherein the sequential manufacturing of a plurality of individually pre-assembled cables in the wiring sequence comprises manufacturing the individually pre-assembled cables with at least one automatic cable assembly machine, the method further comprising sequentially transferring the plurality of individually pre-assembled cables via a transfer interface to the at least one robot.

16. The method according to claim 15, wherein the robot, after prefabricating the first cable end and before feeding and contacting the first cable end, grips the second cable end and feeds it to an automatic cable pre-fabrication machine, whereupon the second cable end receives a pre-fabrication.

17. The method according to claim 7, wherein removing a pre-assembled or an unassembled cable with a robot comprises removing a first cable end of the cable with a first robot and removing a second cable end of the cable with a second robot, such that the cable is held at its two ends by different robots.

18. The method according to claim 17, in which the two robots are operated in a master-slave mode until contact is made with one of the two cable ends, of which the master robot feeds the cable end to be wired first before the other cable end to one of the electrical components, while the slave robot guides the cable end to be wired subsequently.

19. The method of claim 18, wherein the tracking comprises holding the cable end to be subsequently wired at a minimum distance from a mounting plane of the mounting plate and/or tightening the cable end to be subsequently wired when the cable is slack and/or holding the cable end to be subsequently wired under a mechanical bias.

\* \* \* \* \*